Patented Aug. 28, 1945

2,383,704

UNITED STATES PATENT OFFICE 2,383,704

BURNISH GOLD

Kermit H. Ballard, Perth Amboy, N. J., assignor to E. I. du Pont de Nemours & Company, Wilmington, Del., a corporation of Delaware No Drawing. Application January 22, 1944, Serial No. 519,351

10 Claims. (Cl. 106—1)

This invention relates to the preparation of gold compositions having new and improved properties. More particularly, it is concerned with the preparation of burnish gold preparations of the type which are utilized in the decoration of ceramic articles such as dinnerware.

Burnish gold preparations include, as essential components thereof, metallic gold in powdered form and suitable fluxing materials. In addition to these essential components, burnish gold decorating powders usually also contain a solid diluent, present to prevent "metallization" of the gold particles during grinding operations and during the dusting process, steps which are utilized in the manufacture of decalcomanias containing ceramic gold. It is essential that this diluent be capable of disappearing completely from the gold film by volatilization or combustion during the firing operation by which the gold is matured on the ceramicware. In addition to the essential components of burnish gold preparations specified, it is customary to incorporate printing vehicles or fat oils in order to permit the burnish gold to be utilized in printing, stamping, or brushing processes of a type well understood in the art.

The fluxing materials utilized in the preparation of burnish golds are ordinarily bismuth oxide, silver, and lead borate. Up to the present time the only solid diluent material that has been found satisfactory is mercuric oxide. This heavy metal oxide possesses the unique property of being volatile and of relatively high specific gravity, the latter property permitting replacement of a relatively large percentage of the gold powder without any substantial increase in the total bulk volume for a given weight of the gold composition. I have now discovered that the replacement of mercuric oxide as a diluent in burnish gold compositions by powdered elemental sulfur possesses certain definite and outstanding advantages. Among these advantages is the elimination of the health hazard incident to the preparation of burnish gold compositions as presently known wherein the mercuric oxide constituent is toxic in character. Another advantage is the utilization in burnish gold compositions of a material which is more readily available than the strategic raw material mercuric oxide, whose sale and use is carefully controlled at the present time by governmental agencies. Moreover, the use of powdered sulfur introduces into the burnish gold composition a material which reacts chemically with the finely divided gold and silver during the manufacturing operation, thereby preventing segregation of solids, a defect usually present with burnish gold compositions containing mercuric oxide, which defect makes itself especially evident during subsequent decorating operations.

Accordingly, it is an object of this invention to provide an improved solid diluent for use in the preparation of burnish gold compositions, which solid diluent possesses all the advantages of the mercuric oxide diluent now commonly utilized in the preparation of burnish gold compositions. Among these advantages are substantially complete elimination of the solid diluent during firing; non-solubility in the organic vehicles usually employed in burnish gold preparations; the desirable effect of preventing "metallization" of gold particles during subsequent manufacturing operations; and satisfactory working characteristics imparted to the resulting preparations when those preparations are utilized for the various ceramic decorating operations in accordance with procedures well understood in the art.

Another object of this invention is to utilize as solid diluent in burnish gold preparations the non-strategic raw material, elemental sulfur powder, this material eliminating the health hazard present when mercuric oxide is utilized as the solid diluent. These and additional objects of my invention will be apparent from the ensuing disclosures of certain preferred embodiments thereof.

In preparing my improved burnish gold compositions, I have found it desirable to grind, in the usual ball mill, a mixture of metallic gold powder, elemental sulfur powder, powdered silver, and fluxing materials, this mixture being preferably ground while suspended in methanol. While silver is not an essential component of burnish gold preparations, it is usually present because of its effect in improving the abrasion resistance of the fired gold decoration, although this desirable effect is attained at the expense of some alteration in the color of the fired coating. While other mixing processes may be utilized in preparing burnish gold preparations in accordance with my invention, milling in a ball mill is preferable, as it tends to produce a product wherein the sulfur is of a finer particle size, as well as facilitating chemical reaction between the gold and silver metallic powders and the solid sulfur.

After milling the mixture in a ball mill from two to three hours, the charge is poured into a suitable container and the methanol driven off therefrom by evaporation. The resulting burnish gold composition can be utilized directly in the manufacture of ceramic gold decalcomanias, although the dusting properties of the powdered preparation can be considerably improved by the addition thereto of a quantity of "non-smutting" oil. If the burnish gold preparation is to be incorporated in printing, stamping, or brushing gold preparations, the burnish gold powder is mixed in the proper ratio with suitable organic vehicles, all in accordance with procedures which are well understood in the industry.

In order that the mercuric oxide may be satisfactorily replaced by elemental sulfur in burnish gold preparations, it is necessary that the substitution be made on a volume basis rather than on a weight basis. This is essential in order that the total volume of solids for a given weight of burnish gold may be maintained substantially constant, thereby insuring that two similar burnish gold compositions will have equal covering power as far as the resulting fired gold decoration is concerned. What is meant by substitution on an equal volume basis will be apparent from the following explanation.

If the burnish gold preparation consisted of pure powdered gold, it would have a volume of 5.18 cubic centimeters per 100 grams of gold. This is obvious since the bulk weight of powdered pure gold is 19.3 grams per cubic centimeter.

Considering a burnish gold preparation of the type now known containing 10% of mercuric oxide as solid diluent, it is evident that the total volume of this preparation is substantially 5.56 cubic centimeters. It contains 90 grams of gold (equivalent to 4.66 cubic centimeters) and 10 grams of mercuric oxide (equivalent to 0.90 cubic centimeter). The bulk density of solid mercuric oxide is 11.1 grams per cubic centimeter.

If the 10% mercuric oxide diluent were replaced by 10% of elemental solid sulfur, it is evident that the total volume would be 9.66 cubic centimeters, or approximately 74% more than the volume of a similar burnish gold preparation containing 10% of mercuric oxide as the solid diluent. This is apparent from the fact that the 90 grams of gold has a volume of 4.66 cubic centimeters, while 10 grams of sulfur introduces an additional volume of 5.00 cubic centimeters, since powdered sulfur has a bulk density of 2 grams per cubic centimeter. By thus increasing the volume content approximately 74%, it is obvious that the hiding power of the resulting burnish gold preparation is much less for a given amount of the composition than that of the preparation containing 10% of mercuric oxide as solid diluent.

Accordingly, the mercuric oxide is replaced by powdered sulfur as a solid diluent in burnish gold preparations on an equivalent volume basis. In preparing a burnish gold containing powdered sulfur which will be equivalent to the burnish gold preparation containing 10% of mercuric oxide as a solid diluent, there is added only enough sulfur to introduce into the preparation a volume which would be equal to that occupied by the 10% of mercuric oxide if the latter were present. For example, in order to have present 0.90 cubic centimeter of solid diluent in a preparation containing 90 grams of gold (equivalent to 4.66 cubic centimeters), it is necessary to introduce 1.8 grams of powdered solid sulfur. This gives a total volume of 5.56 cubic centimeters, identical with that of the preparation containing 10% of mercuric oxide as diluent, and the proportional gold content of both preparations is the same. It is evident that in utilizing elemental sulfur for replacing mercuric oxide as a solid diluent in burnish gold preparations, the amount of sulfur utilized should be equivalent in volume to that of the mercuric oxide which would normally be used as the solid diluent in the burnish gold preparations of the type now known to the art.

As an example of a new and improved burnish gold composition containing sulfur as solid diluent, the following is illustrative. When this composition is used as a decorating material it gives results fully as satisfactory as those obtained with the burnish gold preparations containing mercuric oxide, and, in addition, possesses the advantages, both in preparation and use, which have been discussed above. The amounts specified are in weight percentages, based on the total weight of the composition.

| | Per cent |
|---|---|
| Powdered metallic gold | 83.3 |
| Flowers of sulfur | 5.7 |
| Powdered silver | 6.4 |
| Bismuth oxide | 3.5 |
| Lead borate | 0.8 |

It should be understood that the foregoing detailed description is intended to be illustrative and not restrictive, as various changes may be made within the scope of the appended claims without departing from the spirit of my invention.

I claim:

1. A burnish gold preparation which comprises metallic gold, metallic silver, and powdered sulfur.

2. A burnish gold preparation which comprises powdered metallic gold, powdered metallic silver, bismuth oxide, and powdered sulfur.

3. A burnish gold preparation which comprises powdered metallic gold, powdered metallic silver, lead borate, and powdered sulfur.

4. A burnish gold preparation which comprises powdered metallic gold, powdered metallic silver, bismuth oxide, lead borate, and powdered sulfur.

5. A burnish gold preparation which comprises substantially 83.6% of metallic gold powder, 6.4% of metallic silver powder, 3.5% of bismuth oxide, 0.8% of lead borate, and 5.7% of sulfur, all said percentages being by weight based on the total weight of said burnish gold preparation.

6. A burnish gold preparation which comprises metallic gold and, as the solid diluent constituent, powdered elementary sulfur.

7. The method of preparing a burnish gold composition which comprises milling a mixture of powdered metallic gold, powdered metallic silver, and sulfur in a ball mill.

8. The method of preparing a burnish gold composition which comprises milling a mixture of gold powder, silver powder, bismuth oxide, lead borate, and sulfur in a ball mill.

9. The method of preparing a burnish gold composition which comprises milling a mixture of metallic gold, metallic silver, and sulfur in a ball mill, said mixture being suspended during said milling operation in a liquid suspending medium.

10. The method of preparing a burnish gold preparation which comprises milling a mixture of metallic gold, metallic silver, and solid sulfur diluent in a ball mill, said mixture being suspended during said milling in methanol.

KERMIT H. BALLARD.